United States Patent
Zimmermann et al.

(10) Patent No.: US 10,239,214 B2
(45) Date of Patent: Mar. 26, 2019

(54) DEVICE AND METHOD FOR RELEASING AN OPERATION OF A MACHINE

(71) Applicant: KUKA Deutschland GmbH, Augsburg (DE)

(72) Inventors: Uwe Zimmermann, Augsburg (DE); Yevgen Kogan, Augsburg (DE)

(73) Assignee: KUKA Deutschland GmbH, Augsburg (DE)

( * ) Notice: Subject to any disclaimer, the term of this patent is extended or adjusted under 35 U.S.C. 154(b) by 0 days.

(21) Appl. No.: 15/554,155

(22) PCT Filed: Mar. 10, 2016

(86) PCT No.: PCT/EP2016/000434
§ 371 (c)(1),
(2) Date: Aug. 28, 2017

(87) PCT Pub. No.: WO2016/150556
PCT Pub. Date: Sep. 29, 2016

(65) Prior Publication Data
US 2018/0071920 A1    Mar. 15, 2018

(30) Foreign Application Priority Data
Mar. 20, 2015 (DE) .................. 10 2015 003 696

(51) Int. Cl.
*B25J 13/08* (2006.01)
*B25J 9/16* (2006.01)
(Continued)

(52) U.S. Cl.
CPC ........... *B25J 13/085* (2013.01); *B25J 9/1674* (2013.01); *B25J 13/00* (2013.01); *B25J 19/06* (2013.01);
(Continued)

(58) Field of Classification Search
CPC . B25J 13/00; B25J 13/003; B25J 13/02; B25J 13/025; B25J 13/08; B25J 13/081;
(Continued)

(56) References Cited

U.S. PATENT DOCUMENTS

| | | | |
|---|---|---|---|
| 4,931,711 | A | 6/1990 | Naruo |
| 5,212,433 | A | 5/1993 | Yasuyuki |

(Continued)

FOREIGN PATENT DOCUMENTS

| | | | |
|---|---|---|---|
| AT | 10676 | U1 | 8/2009 |
| AT | 511488 | A2 | 12/2012 |

(Continued)

OTHER PUBLICATIONS

European Patent Office; Search Report in International Patent Application No. PCT/EP2016/000434 dated Jun. 6, 2016; 4 pages.

(Continued)

*Primary Examiner* — Van T Trieu
(74) *Attorney, Agent, or Firm* — Dorton & Willis, LLP

(57) ABSTRACT

A safety control device for releasing an operation of a machine, in particular a robot, includes an input device for detecting a manual contact, in particular a finger contact. The safety control device has a retaining device for securing the input device to a finger, in particular a fingertip, of an operator, in particular in a frictional manner, and/or a signaling means for outputting a signal, in particular an optical, acoustic, tactile, thermal, and/or electric signal, if a contact force detected by the input device is smaller than a specified upper minimum value and/or for outputting a signal, in particular the same signal or a different signal, in particular an optical, acoustic, tactile, thermal, and/or electric signal, if a contact force detected by the input device is greater than a specified lower maximum value.

21 Claims, 1 Drawing Sheet

(51) Int. Cl.
*B25J 19/06* (2006.01)
*B25J 13/00* (2006.01)

(52) U.S. Cl.
CPC ... *B25J 19/063* (2013.01); *G05B 2219/40218* (2013.01)

(58) Field of Classification Search
CPC ...... B25J 13/082; B25J 13/084; B25J 13/085; B25J 13/087; B25J 19/00; B25J 19/02; B25J 19/021; B25J 19/026; B25J 19/027; B25J 19/06; B25J 19/061; B25J 19/063
See application file for complete search history.

(56) References Cited

U.S. PATENT DOCUMENTS

| | | | |
|---|---|---|---|
| 6,160,324 A | | 12/2000 | Terada et al. |
| 2003/0018411 A1 | | 1/2003 | Suita et al. |
| 2006/0284858 A1* | 12/2006 | Rekimoto | ............... G06F 3/033 345/173 |
| 2007/0236450 A1* | 10/2007 | Colgate | ................... G06F 3/016 345/156 |
| 2011/0316724 A1* | 12/2011 | Morieda | ................. G06F 3/016 341/20 |
| 2014/0156066 A1* | 6/2014 | Sakano | .................. B25J 13/082 700/245 |
| 2016/0263762 A1* | 9/2016 | Ramaswamy | ......... B26D 5/005 |

FOREIGN PATENT DOCUMENTS

| | | |
|---|---|---|
| DE | 69506840 T2 | 8/1999 |
| DE | 10023199 A1 | 1/2001 |
| EP | 2664971 A1 | 11/2013 |
| EP | 2671690 A1 | 12/2013 |

OTHER PUBLICATIONS

German Patent Office; Office Action in German Patent Application No. 10 2015 003 696.3 dated Mar. 4, 2016; 5 pages.

\* cited by examiner

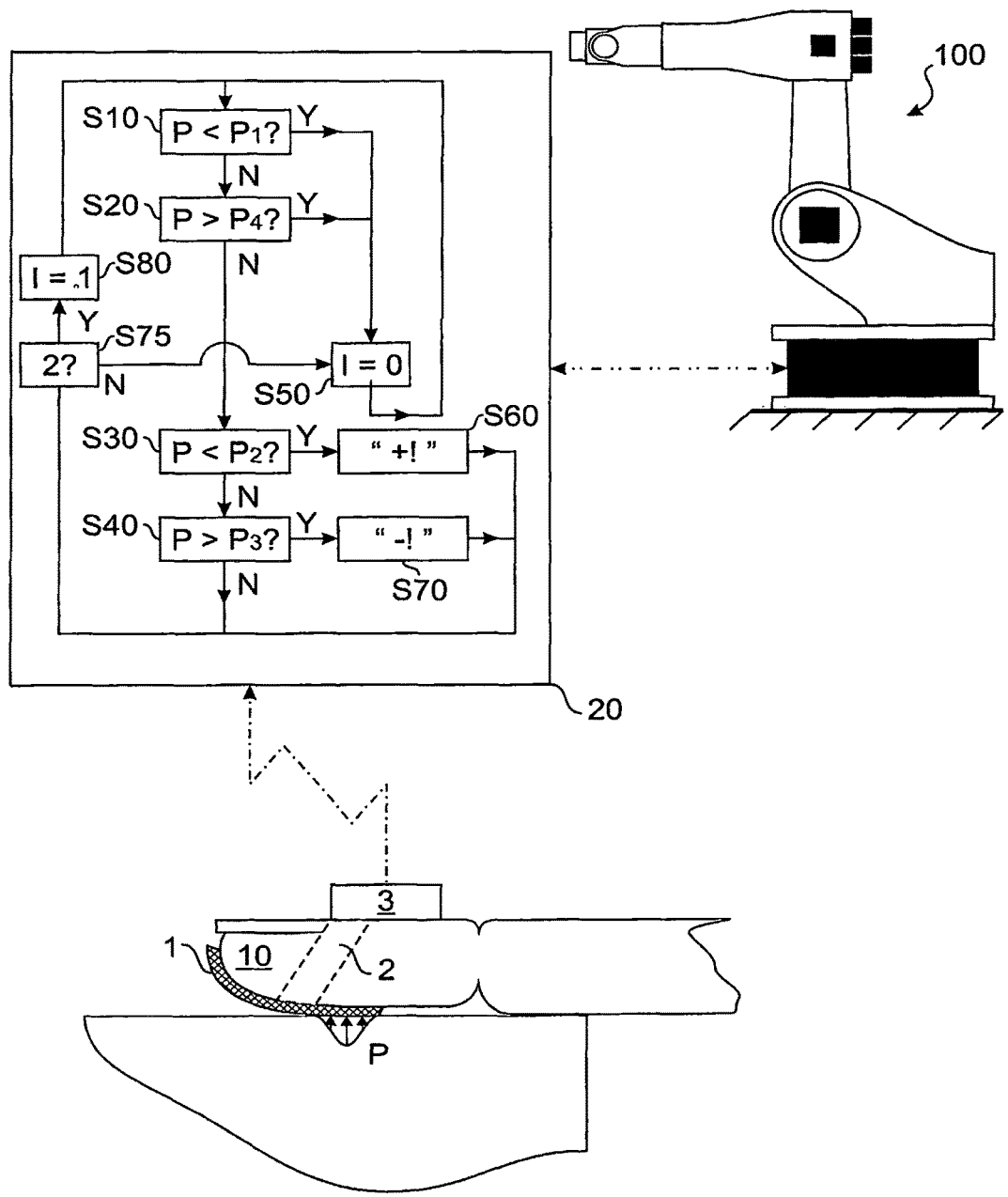

DEVICE AND METHOD FOR RELEASING AN OPERATION OF A MACHINE

CROSS-REFERENCE

This application is a national phase application under 35 U.S.C. § 371 of International Patent Application No. PCT/EP2016/000434, filed Mar. 10, 2016 (pending), which claims the benefit of German Patent Application No. DE 10 2015 003 696.3, filed Mar. 20, 2015, the disclosures of which are incorporated by reference herein in their entirety.

TECHNICAL FIELD

The present invention relates to a safety control device and a method for releasing an operation of a machine, particularly a robot, as well as a computer program product for implementing the method.

BACKGROUND

A sensor device is known from EP 2 664 971 A1 which detects a pressure exerted upon an area of a touchscreen, with a control device executing a reaction depending on the pressure applied. In a preferred embodiment an actuating element is provided, whereby an actuation of the actuation element additionally being evaluated for applying pressure upon the touchscreen and any activation of drives occurs only when the actuation element is additionally activated.

The object of the present invention is to improve the operation of a machine, particularly a robot.

SUMMARY

This object is attained by a safety control device as shown and described herein.

According to a first aspect of the present invention, a safety control device for releasing the operation of a machine, in particular a robot, comprises an input means for detecting a manual and/or manually triggered contact, in particular a manual and/or manually triggered contact force, in particular a finger contact and/or a finger contact force, whereby the safety control device comprises a holding device, in particular for the friction-fitting fastening of the input means to a finger, particularly a fingertip, of an operator.

Accordingly, in one embodiment the input means is fastened via the holding device, in particular in a friction-fitting fashion, on a finger, in particular on a fingertip of an operator.

This way, in one embodiment a virtual consent key, as it were, can be provided, which can advantageously also be operated by the finger during another operation of the hand, for example when manually guiding the robot or activating an input element, such as a mouse, a joystick, or a touch screen.

In one embodiment, the holding device comprises one or more tapes, particularly elastic and/or Velcro-tapes, and/or one or more, particularly elastic clamps. This way the input element can advantageously be fastened to different fingers.

In one embodiment, the holding device can be connected to the input element in a detachable or in a permanent fashion, in particular in a material-to-material fashion, is particularly connected thereto, or is designed integrally and/or made in one piece.

The input means and/or the holding device are formed in one embodiment elastically and/or like films and/or, particularly jointly, like a thimble. In one embodiment the holding device is made from plastic, particularly thermoplast and/or thermoset synthetic, and/or rubber, and/or artificial skin, with the input means in one embodiment at least partially being formed from this material or being formed therein.

Through an elastic and/or film-like and/or thimble-like holding device and/or an elastic input means and/or one embodied like a film and/or a thimble, particularly embodied integrally therewith, in one embodiment the use of the hand is for other purposes advantageously influenced only to a minor extent.

According to a second aspect of the present invention, which is particularly implemented independently or can be combined with the first aspect, a safety control device for releasing an operation of a machine, particularly a robot, comprises one and/or the input means for detecting a manual and/or manually triggered contact, in particular a manual and/or a manually triggered contact force, particularly a finger contact and/or a finger contact force, and a signal means, which at least partially in an automated fashion issues particularly an optic, acoustic, tactile, thermal, and/or electric signal if a contact force is detected by the input means, particularly a finger contact force, which is below a predetermined upper minimum value and/or is set up with technology for this purpose, in particular hardware and/or software.

Additionally or alternatively the signal mean or means of the safety control device issues one, particularly the same or a different, particularly optic, acoustic, tactile, thermal, and/or electric signal if the contact force detected by the input means is greater than a predetermined lower maximum value and/or is set up with technology for this purpose, in particular hardware and/or software.

This way, in one embodiment the user can be advantageously warned before he/she (unintentionally) leaves the range of consent of the contact force, which is limited by a predetermined lower minimal value, which is lower than the upper minimal value, and a predetermined upper maximum value, which is greater than the lower minimum value. Accordingly, the signal can be detected in one embodiment by a person, particularly with optic, acoustic, tactile, thermal, and/or electric means.

By issuing different signals when the upper minimum value has fallen short and the lower maximum value has been exceeded, the operator can advantageously be provided with a change in direction of the contact force.

The safety control device comprises in one embodiment release means that can be connected particularly wirelessly or wired to the input means and in particular is connected thereto for releasing the operation of the machine only if a contact force detected by the input means exceeds a predetermined lower minimal value and/or is below a predetermined upper maximum value. Through the wireless connection, advantageously, the flexibility can be increased; through a wired connection, advantageously, the safety.

In one embodiment the release means automatically releases at least partially the operation of the machine only if a/the contact force detected by the input means exceeds a/the predetermined lower minimum value and/or is below a/the predetermined upper maximum value.

By predetermining a lower minimum value for a contact force detected by the input means, in one embodiment advantageously the risk of an unintended release of the operation is reduced. In particular, through the additional and/or cumulative predetermination of an upper maximum value for the contact force detected by the input means in one embodiment advantageously the risk of a panic and/or reflex-caused undesired release of the operation is reduced.

In one embodiment the lower minimal value is below the upper minimum value, the lower and/or the upper minimum value is below the lower and/or upper maximum value, and/or the lower maximum value is below the upper maximum value.

Any operation (to be released and/or released) can particularly include a motion of one or more, particularly all axes of the machine, particularly the robot, in particular a motion at a speed exceeding the predetermined (reduced) maximum speed. In other words, in one embodiment a not-released operation may include a motion of one or more axes with a speed which abstains from exceeding a predetermined (reduced) maximum speed. Similarly, in another embodiment a motion of one or more, particularly all axes of the machine, particularly the robot, may be stopped and/or prevented as long as the operation is not and/or has not been released.

The release means may clear the operation particularly such that it issues an appropriate release signal, closes and/or activates an energy supply to drives of the machine, or the like. Accordingly, the release means can in one embodiment abstain from releasing the operation particularly such that it issues an error signal, shuts down the machine, particularly interrupts the energy supply to drives of the machine, or the like.

In one embodiment (the signal means) varies the signal issued by the signal means at least partially in an automatic fashion with and/or depending on a distance of the contact force from one of the minimum and/or maximum values and/or is set up with technology for this purpose, in particular hardware and/or software.

In particular, the signal issued by the signal means can vary with and/or based on a distance of the contact force from the lower or upper minimum value and/or with and/or based on a distance of the contact force from the lower or upper maximum value. In particular, a color, brightness, blinking frequency, loudness, pitch, vibration frequency, and/or vibration amplitude, temperature and/or amperage can increase in case of a reduced distance from the lower minimum value and/or the upper maximum value and/or increase in case of an increasing distance from the upper minimum value and away from the lower maximum value and/or towards the lower maximum value and away from the upper minimum value, particularly in a continuous fashion or in one or more discrete steps. This way, the operator can advantageously estimate more precisely how strongly the contact force must be changed.

In particular, for this purpose, it may be advantageous, as explained above, that different signals are issued when the lower maximum value and the upper minimal value are exceeded in order to provide the operator with a change of direction of the contact force.

In one embodiment, a minimum displacement path of a contact area, particularly a finger contact area of the input means for detecting a predetermined minimum force for releasing the operation of the machine and/or the lower minimum value of the contact force measures maximally 1 mm, particularly maximally 0.5 mm, particularly maximally 0.1 mm, and particularly less than 0.05 mm.

In other words, in one embodiment it is suggested to use a particularly (stiff) joint-free, touch-sensitive, particularly pressure sensitive surface, particularly a touchpad or a touchscreen, as the approval key.

This is, in particular, advantageously possible when, upon the upper minimum value having fallen short or the lower maximum value having been exceeded, the operator is warned by a signal before the lower minimum value has fallen short and/or the upper maximum value is exceeded, leading to the machine being stopped due to the missing release by the release means. In particular in such small travel paths, particularly in case of touchpads or touchscreens macroscopically and/or haptically at least essentially free from any travel path, in which the operator is not provided with haptic feedback based on a significant travel path, which can be detected reliably particularly in a haptic fashion, in one embodiment the risk of an unintentional shut-down of the machine due to faulty operation of a consent key can be reduced.

In one embodiment, the detection means detects at least partially in an automatic fashion a fastening of the input means on a finger particularly optically, thermally, electrically, and/or load-based, and/or is developed and/or set up with technology for this purpose, in particular hardware and/or software.

This way, in one embodiment advantageously the risk of a faulty detection of a contact force without the input means being fastened to a finger can be reduced, for example by an object accidentally being placed on the input means not properly attached.

In one embodiment, the detection means prevents at least partially in an automatic fashion the release of the operation of the machine if no fastening of the input means is detected on a finger and/or is developed and/or set up with technology for this purpose, in particular hardware and/or software.

A load-based detection can particularly include the detection of an extension or tension (in) the holding device (by the finger).

In one embodiment the input means, signal means, release means, and/or detection means and/or their signal and/or data connection are embodied in a secure technology, particularly redundantly, particularly diversely. Accordingly, in one embodiment the detection of the manual contact, particularly the finger contact, particularly the (finger)contact force occurs by the input means, the fastening of the input means at a finger by the detection means, the issuing of signals by the signal means, and/or the release of the operation by the release means in a secure technology, particularly redundantly, particularly diversely.

In one embodiment the input means detects a manual contact, particularly of a finger, the palm of a hand, or the like in an optic, thermal, electric, particularly capacitive, resistive, inductive, or the like fashion, and/or is provided and/or set up with technology for this purpose, in particular hardware and/or software. Additionally or alternatively the input means detects in one embodiment a manual contact force, particularly a contact force applied by a finger, the palm of a hand, or the like particularly upon a contact area of the input means, particularly based on a detected pressure, a detected voltage, a detected deformation, or the like and/or is developed and/or set up with technology for this purpose, in particular hardware and/or software. In the present case even a (planar distributed) contact pressure is understood in a general fashion as a contact force in the sense of the present invention. Accordingly, the input means detects in one embodiment a manually applied contact pressure, particularly a pressure applied by a finger, the palm of a hand, or the like upon a contact area of the input means, particularly a touchpad or touchscreen and/or is developed with technology for this purpose, in particular hardware and/or software.

Means in the sense of the present invention can be embodied using hardware and/or software technology, particularly comprising a particularly digital processing unit, particularly microprocessor unit (CPU) and/or one or more programs or program modules connected preferably to a memory and/or bus system for data transmission and/or signal transmission. The CPU can be embodied for processing commands, implemented as a program saved in a memory system, detecting input signals from a data bus, and/or issuing output signals to a data bus. A memory system may comprise one or more, particularly various storage media, particularly optic, magnetic, solid-matter, and/or other non-volatile media. The program can then be designed such that it implements the method described here and/or can execute it such that the CPU can execute the steps of such methods and thus can particularly release the operation of the machine.

Additional advantages and features are discernible from the accompanying drawings and the description of exemplary embodiments.

BRIEF DESCRIPTION OF THE DRAWINGS

FIG. 1 shows a safety control device when implementing a method for the release of operation of a robot according to one embodiment of the present invention.

DETAILED DESCRIPTION

FIG. 1 shows a robot 100 and a robot control 20, in which a signal and release means of a safety control device is at least partially implemented for releasing the operation of the robot according to one embodiment of the present invention, with the robot control 20 being signal connected to the drives of the robot 100, as indicated by dot-dash lines in FIG. 1.

The safety control further comprises a thimble-like input means 1 for detecting a contact pressure P applied by a fingertip 10 of an operator and/or acting upon it, which is fastened only via a schematically-indicated holding device 2 at the finger in a friction-fitting fashion. The film-like input means 1 is embodied with a pressure sensitive surface, which converts and records pressures and/or forces into an electric parameter and/or is implemented for this purpose, and is connected via a transmitter 3 in a wireless fashion to the robot control 30 to send signals, as indicated in FIG. 1 by dot-dash lines.

The signal and/or release means at least partially implemented in the robot control 20 automatically perform a method according to one embodiment of the present invention explained in the following with reference to FIG. 1.

In a first step S10 the release means checks if the (finger)contact force P detected by the input means 1 is lower than a predetermined lower minimum value $P_1$. If this is the case (S10: "Y") the release means performs step S50 in which it stops the operation of the robot 100 and/or prevents the release thereof, for example by severing the energy supply of the robot or issuing an appropriate error signal ("I=0").

Otherwise (S10: "N") the release means checks in another step S20 if the contact force P detected by the input means is greater than a predetermined upper maximum value $P_4$. If this is the case (S20: "Y") the release means in turn executes step S50. From step S50 the method respectively returns, for example cyclically, to step S10.

When the detected contact force P is below an upper maximum value $P_4$ (S20: "N") the signal means checks in a step S30 if the contact force P detected by the input means 1 is below a predetermined upper minimal value $P_2$, which is greater than the lower minimum and below the upper maximum value. If this is the case (S30: "Y") the signal means executes step S60, in which it issues a signal ("+!"), which prompts the operator to increase the contact force P. This signal may vary with the distance of the contact force P from the lower minimum value $P_1$, particularly with a lower distance to $P_1$ and simultaneously can be intensified with an increasing distance from $P_2$.

After step S60, the release means continues with a step S75 explained in the following.

When the detected contact force P is not smaller than the upper minimum value $P_2$ (S30: "N") the signal means checks in a step S40 if the contact force P detected by the input means 1 is greater than a predetermined lower maximum value $P_3$, which is greater than the upper minimum and below the upper maximum value ($P_1<P_2<P_3<P_4$). If this is the case (S40: "Y"), the signal means executes step S70 in which it issues a different signal ("−!") than in step S60, which prompts the operator to reduce the contact force P. This signal may vary with the distance of the contact force P from the upper maximum value $P_4$, particularly become more intense with a lower distance from $P_4$ and simultaneously according to an increasing distance from $P_3$.

Subsequently to step S70, the release means executes step S75.

If the detected contact force P is however not greater than the lower maximum value $P_3$ (S40: "N") the release means executes step S75, without the signal means executing step S70.

A detection means is implemented in the transmitter 3, which automatically detects a fastening of the input means 1 to a finger 10.

The detection means checks in step S75 if the input means 1 is fastened to a finger 10. If this is not the case (S75: "N") the method continues with step S50 such that the operation of the robot 100 is not released.

If the detection means determines in step S75 that the input means 1 is fastened to a finger 10 (S75: "Y") the release means executes a step S80, in which it releases the operation of the robot 100, for example by closing the energy supply of the robot and/or issuing a respective release signal ("I=1"). Then the method returns back to step 10, as from step S50.

With the steps S30, S40, S60, and S70 the user can be advantageously warned in one embodiment before he/she (unintentionally) leaves a consent range [$P_1$, $P_4$] of the contact force P, which is limited by the lower minimum value $P_1$ and the upper maximum value $P_4$.

By issuing different signals ("+!";"−!") when the upper minimum value $P_2$ has fallen short and the lower maximum value $P_3$ has been exceeded, the operator can advantageously be provided with a change of direction of the contact force.

By the step S75, the risk of a faulty detection of a contact force without the input means being fastened to a finger can be reduced, for example by an object accidentally being placed onto the input means.

Input, signal, release, and detection means and their signal and/or data connection are embodied in a secure technology.

Although in the above description exemplary embodiments are discussed, it shall be pointed out that a plurality of variations is possible, here.

The first and the second aspect were jointly realized and/or explained in one exemplary embodiment. Similarly, in another embodiment the input means may show a touchpad or touchscreen with a relatively stiff, touch-sensitive surface so that a minimal travel path of the touch-sensitive surface and/or (finger)contact area for detecting the lower minimum value $P_1$ of the contact force amounts to maximally 1 mm, particularly maximally 0.5 mm, particularly maximally 0.1 mm, and particularly less than 0.05 mm.

In particular in case of such short travel paths, in which the operator cannot receive any haptic feedback based on a significant, particularly haptically detected travel path in a reliable fashion, by the steps S30, S40, S60, and S70 the risk of any unintentional shut-down of the machine can be reduced by faulty operation of a touchpad or touchscreen used as a consent key.

Inversely, a consent key fastened at a finger can also be used without a signal being issued before leaving the consent range.

Furthermore, it shall be pointed out that the exemplary embodiments only represent examples, which shall not limit the range of protection, the applications, and the design in any way. Rather, one trained in the art shall be provided with the above-description as a guideline for implementing at least one exemplary embodiment, with various changes, particularly with regards to the function and arrangement of the described components being performed without leaving the range of protection, as discernible from the claims and any equivalent combination of features.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE CHARACTERS

1 input means
2 holding device
3 transmitting+detection means
10 finger(tip)
20 robot control (release and signal means)
100 robot
P contact force
$P_1$ lower minimum value
$P_2$ upper minimum value
$P_3$ lower maximum value
$P_4$ upper maximum value

What is claimed is:

1. A safety control device for releasing the operation of a machine, the safety control device comprising:
an input means for detecting a manual contact; and at least one of:
a holding device for fastening the input means to a finger of an operator, or
a signal means for issuing at least one of a first signal when a contact force detected by the input means is below a predetermined upper minimum value, or a second signal when a contact force detected by the input means exceeds a predetermined lower maximum value.

2. The safety control device of claim 1, wherein at least one of:
the machine is a robotic manipulator;
the input means is configured to detect a finger contact by a user;
the holding device is configured for friction-fitting the input means to the finger of the user;
the holding device is configured to fasten the input means to the tip of the user's finger;
the second signal is the same as the first signal, or different from the first signal; or
the signal means issues at least one of an optic signal, an acoustic signal, a tactile signal, a thermal signal, or an electric signal.

3. The safety control device of claim 1, further comprising a release means that can be connected to the input means, the release means releasing operation of the machine only if at least one of:
a contact force detected by the input means exceeds a predetermined lower minimum value; or
a contact force detected by the input means is below a predetermined upper maximum value.

4. The safety control device of claim 3, wherein the release means can be connected to the input means by at least one of one of wired or wireless.

5. The safety control device of claim 1, wherein the signal issued by the signal means varies with a distance of the contact force from at least one of the minimum value or a maximum value.

6. The safety control device of claim 1, wherein the input means comprises a contact area, and a minimum travel path in the contact area that must be traveled by the manual contact for the input means to detect a predetermined minimal force for releasing operation of the machine is 1 mm or less.

7. The safety control device of claim 6, wherein the minimum travel path in the contact area that must be traveled by the manual contact for the input means to detect the predetermined minimal force is less than 0.5 mm.

8. The safety control device of claim 1, wherein the input means is at least one of elastic, film-like, or thimble-like.

9. The safety control device of claim 1, further comprising detection means for detecting fastening of the input means to a finger of a user.

10. The safety control device of claim 9, wherein the detection means is one of optic based, thermal based, electric based, or load based.

11. A method for releasing an operation of a machine, comprising:
obtaining a safety control device according to claim 1; and at least one of:
a) fastening the input means to a finger of an operator with the holding device; or
b) detecting a contact force with the input means, and at least one of:
issuing a first signal when the contact force detected by the input means is below a predetermined upper minimum value, or
issuing a second signal when the contact force detected by the input means exceeds a predetermined lower maximum value.

12. The method of claim 11, wherein at least one of the first or second signal is at least one of an optic, acoustic, tactile, thermal, or electric signal.

13. The method of claim 11, wherein the second signal is one of the same or a different signal than the first signal.

14. The method of claim 11, wherein at least one of:
the input means is fastened to a finger by the holding device in a friction-fitting manner; or the input means is fastened to a fingertip by the holding device.

15. The method of claim 11, further comprising releasing the operation of the machine with the release means in an at least partially automated fashion only if at least one of:
   the contact force detected by the input means exceeds a predetermined lower minimum value; or
   the contact force detected by the input means is below a predetermined upper maximum value.

16. The method of claim 11, further comprising:
   varying the signal issued by the signal means in an at least partially automatic fashion based on a distance of the contact force from one of the minimum or maximum values.

17. The method of claim 11, wherein:
   the input means comprises a contact area; and
   a minimum travel path in the contact area that must be traveled by the manual contact for the input means to detect a predetermined minimal force for releasing operation of the machine is 1 mm or less.

18. The method of claim 17, wherein the minimum travel path in the contact area that must be traveled by the manual contact for the input means to detect the predetermined minimal force is less than 0.5 mm.

19. The method of claim 11, further comprising:
   detecting with the detection means, in an at least partially automatic fashion, a fastening of the input means to a finger.

20. The method of claim 19, wherein detection of a fastening of the input means to a finger comprises at least one of optic, thermal, electric, or load-based detection.

21. A computer program product for use with a safety control device according to claim 1, the computer program product comprising a program code stored in a non-transitory, computer-readable storage medium, the program code, when executed by the safety control device, causing the safety control device to:
   detect a contact force with the input means; and at least one of:
      issue a first signal when the contact force detected by the input means is below a predetermined upper minimum value, or
      issue a second signal when the contact force detected by the input means exceeds a predetermined lower maximum value.

* * * * *